(12) United States Patent
Xu (10) Patent No.: US 9,293,934 B2
(45) Date of Patent: Mar. 22, 2016

(54) BATTERY CHARGING METHOD AND MOBILE TERMINAL

(71) Applicant: Huawei Device Co., LTD, Shenzhen (CN)

(72) Inventor: Shunhai Xu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 342 days.

(21) Appl. No.: 13/858,749

(22) Filed: Apr. 8, 2013

(65) Prior Publication Data

US 2013/0300347 A1 Nov. 14, 2013

(30) Foreign Application Priority Data

Apr. 9, 2012 (CN) .......................... 2012 1 0101668

(51) Int. Cl.
*H02J 7/00* (2006.01)
*H02J 7/04* (2006.01)

(52) U.S. Cl.
CPC ............. *H02J 7/0052* (2013.01); *H02J 7/0004* (2013.01); *H02J 2007/0096* (2013.01)

(58) Field of Classification Search
CPC ............................... H02J 7/0004; H02J 7/0052
USPC .......................................... 320/106, 107, 162
See application file for complete search history.

(56) References Cited

U.S. PATENT DOCUMENTS

| | | | |
|---|---|---|---|
| 5,495,503 A | 2/1996 | King et al. | |
| 5,557,190 A * | 9/1996 | Brotto ................... | H02J 7/0081 320/148 |
| 5,686,815 A * | 11/1997 | Reipur et al. ................. | 320/116 |
| 5,796,239 A * | 8/1998 | van Phuoc et al. ............ | 320/107 |
| 5,818,197 A * | 10/1998 | Miller et al. ................... | 320/107 |
| 5,912,544 A | 6/1999 | Miyakawa et al. | |
| 6,175,211 B1 | 1/2001 | Brotto | |
| 6,218,806 B1 * | 4/2001 | Brotto et al. ................... | 320/106 |
| 6,489,751 B2 * | 12/2002 | Small et al. .................... | 320/150 |
| 7,039,150 B1 | 5/2006 | Drori | |

(Continued)

FOREIGN PATENT DOCUMENTS

| | | |
|---|---|---|
| CN | 1478316 A | 2/2004 |
| CN | 1747332 A | 3/2006 |

(Continued)

OTHER PUBLICATIONS

Extended European Search Report received in Application No. 13162836.4-1804 mailed Oct. 15, 2013, 8 pages.

(Continued)

*Primary Examiner* — M'Baye Diao (74) *Attorney, Agent, or Firm* — Slater & Matsil, L.L.P.

(57) ABSTRACT

Embodiments of the present invention provide a battery charging method, related to the field of electronic technologies and invented to shorten the charging time. The method includes: determining, by a mobile terminal, a specification parameter of a battery to be charged; determining, by the mobile terminal, a charging parameter corresponding to the specification parameter according to the determined specification parameter; and charging, by the mobile terminal, the battery to be charged according to the determined charging parameter. Embodiments of the present invention also provide a corresponding mobile terminal. The present invention is applicable to charging of a mobile terminal.

9 Claims, 5 Drawing Sheets

(56) References Cited

U.S. PATENT DOCUMENTS

| | | | |
|---|---|---|---|
| 2001/0000212 A1* | 4/2001 | Reipur et al. | 320/104 |
| 2003/0102842 A1* | 6/2003 | Tamai et al. | 320/106 |
| 2003/0218446 A1 | 11/2003 | Beerwerth et al. | |
| 2004/0041568 A1* | 3/2004 | Yang | H02J 7/1461 |
| | | | 324/426 |
| 2004/0196006 A1 | 10/2004 | Kawaguchi et al. | |
| 2005/0010782 A1* | 1/2005 | Ohkubo | 713/182 |
| 2005/0057216 A1* | 3/2005 | Yamaguchi et al. | 320/106 |
| 2005/0174094 A1 | 8/2005 | Purdy et al. | |
| 2005/0248311 A1 | 11/2005 | Komaki et al. | |
| 2007/0123304 A1* | 5/2007 | Pattenden et al. | 455/557 |
| 2010/0109890 A1* | 5/2010 | Montplaisir et al. | 340/636.1 |
| 2011/0165442 A1 | 7/2011 | Hashimoto et al. | |
| 2013/0162196 A1* | 6/2013 | Li | 320/107 |
| 2013/0169214 A1* | 7/2013 | Tseng | 320/107 |
| 2013/0257358 A1 | 10/2013 | Hussain et al. | |

FOREIGN PATENT DOCUMENTS

| | | |
|---|---|---|
| CN | 1914582 A | 2/2007 |
| CN | 1960111 A | 5/2007 |
| CN | 101645523 A | 2/2010 |
| EP | 1128517 A2 | 8/2001 |
| EP | 1300921 A1 | 4/2003 |
| JP | 09330741 A | 12/1997 |
| JP | 10210677 A | 8/1998 |
| JP | 2000023386 | 1/2000 |
| JP | 2002199606 A | 7/2002 |
| JP | 2002315203 A | 10/2002 |
| JP | 2005321983 A | 11/2005 |
| JP | 2007187533 A | 7/2007 |
| JP | 2007221993 A | 8/2007 |
| JP | 2009303399 A | 12/2009 |
| JP | 2010104100 A | 5/2010 |
| JP | 20100136555 A | 6/2010 |
| JP | 2011067022 A | 3/2011 |
| JP | 201219577 A | 1/2012 |
| JP | 201263907 A | 3/2012 |
| WO | 2010007681 A1 | 1/2010 |

OTHER PUBLICATIONS

Notice of Reason for Rejection received in Application No. 2013-081006 mailed Mar. 11, 2014, 11 pages.

International Search Report and Written Opinion received in Application No. PCT/CN2013/070019, mailed Apr. 18, 2013, 16 pages. (Partial Translation).

* cited by examiner

FIG. 1A

Contact design of
the back cover

FIG. 1B

Hardware design of
the board

BATTERY CHARGING METHOD AND MOBILE TERMINAL

CROSS-REFERENCE TO RELATED APPLICATIONS

This application claims priority to Chinese Patent Application No. 201210101668.6, filed on Apr. 9, 2012, which is hereby incorporated by reference in its entirety.

FIELD OF THE INVENTION

The present invention relates to the field of electronic technologies, and in particular, to a battery charging method and a mobile terminal.

BACKGROUND OF THE INVENTION

At present, a user has increasingly higher requirements on the standby time and size of a mobile terminal. To meet the user's requirements on the standby time and size of a mobile terminal, the mobile terminal may be provided with multiple batteries having different capacities, or two batteries are directly arranged in the body of the mobile terminal for the backup purpose, so that the user makes selection according to actual requirements.

However, according to the conventional software solution, when a battery is charged, the charging parameter of the battery is set based on the lowest capacity of the battery to ensure safety and avoid damage during the charging. Therefore, when a battery having a large capacity is charged, because the charging parameter of the battery is set based on the lowest capacity of the battery, the charging time is too long, affecting the user experience.

SUMMARY OF THE INVENTION

Embodiments of the present invention provide a battery charging method and a mobile terminal, which are capable of implementing adaptive fast charging according to a battery specification parameter while ensuring safety, so as to shorten the charging time and enhance the user experience.

To achieve the preceding objectives, embodiments of the present invention adopt the following technical solutions:

According to one aspect of the present invention, a battery charging method is provided. The method includes:

determining, by a mobile terminal, a specification parameter of a battery to be charged;

determining, by the mobile terminal, a charging parameter corresponding to the specification parameter according to the determined specification parameter; and charging, by the mobile terminal, the battery to be charged according to the determined charging parameter.

According to another aspect of the present invention, a mobile terminal is provided. The mobile terminal includes:

a detector, configured to determine a specification parameter of a battery to be charged;

a determinator, configured to determine a charging parameter corresponding to the specification parameter according to the specification parameter determined by the detector; and a charger, configured to charge the battery to be charged according to the charging parameter determined by the determinator.

With the preceding technical solutions, by using the battery charging method and mobile terminal provided by the embodiments of the present invention, a specification parameter of a battery is determined first, and then a corresponding charging parameter is determined according to the determined specification parameter, so that the charging parameter is changed dynamically according to the specification parameter of the battery. Because the charging time varies depending on the charging parameters of batteries, when the battery specification parameter is changed, the charging parameter is changed, and charging time is changed accordingly. Compared with the prior art in which a unified charging parameter is used for batteries of any specifications, the embodiments of the present invention are capable of dynamically adjusting the charging parameter according to the battery specification parameter, for example, for a small-capacity battery, using a charging parameter dedicated to the small-capacity battery, and for a large-capacity battery, using a charging parameter dedicated to the large-capacity battery. In this way, safety can be ensured, and fast charging can be implemented for a battery, and in particular, a large-capacity battery. Evidently, the embodiments of the present invention are capable of implementing adaptive fast charging according to the specification parameter while ensuring safety, so as to shorten the charging time and enhance the user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION OF THE EMBODIMENTS

The following clearly and completely describes the technical solutions in the embodiments of the present invention with reference to the accompanying drawings in the embodiments of the present invention. It is obvious that the embodiments to be described are merely a part rather than all of the embodiments of the present invention. All other embodiments obtained by persons skilled in the art based on the embodiments of the present invention without creative efforts shall fall within the protection scope of the present invention.

Figure 1A:
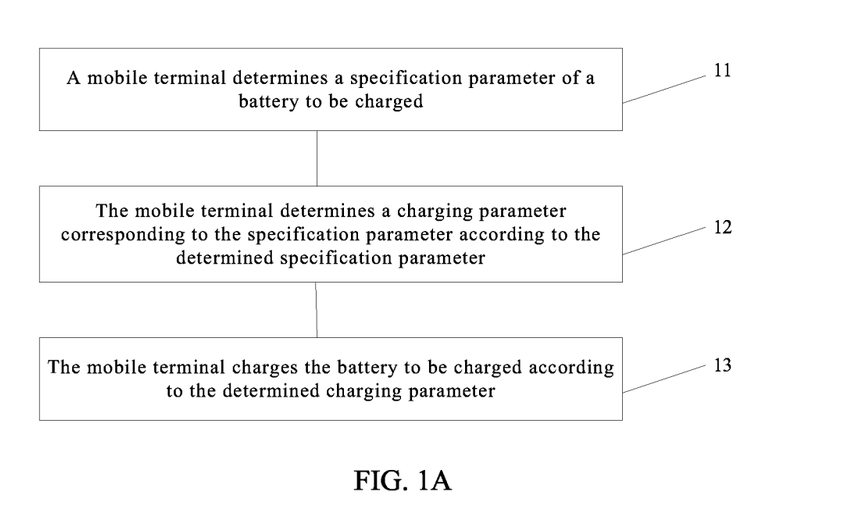
FIG. 1A is a flowchart of a battery charging method according to an embodiment of the present invention.

FIG. 1A is a flowchart of a battery charging method according to an embodiment of the present invention.

An embodiment of the present invention provides a battery charging method. As shown in FIG. 1A, the method includes the following:

11. A mobile terminal determines a specification parameter of a battery to be charged.

The specification parameter of the battery may include: battery capacity, and charging limiting voltage. Determining, by the mobile terminal, the specification parameter of the battery to be charged may include: determining, by the mobile terminal, the battery capacity and/or charging limiting voltage of the battery to be charged.

12. The mobile terminal determines a charging parameter corresponding to the specification parameter according to the determined specification parameter.

Specifically, determining, by the mobile terminal, the charging parameter corresponding to the specification parameter according to the determined specification parameter may include: determining, by the mobile terminal, a charging parameter corresponding to the battery capacity and/or charging limiting voltage according to the determined battery capacity and/or charging limiting voltage.

For example, correspondence between battery capacities and/or charging limiting voltages and charging parameters may be set. The correspondence may be one-to-one correspondence, or may be correspondence between multiple battery capacities and/or charging limiting voltages and a group of charging parameters. In this way, after the battery capacity and/or charging limiting voltage is determined, the corresponding charging parameter may be determined.

Therefore, alternatively, the method may further include: storing correspondence between specification parameters and charging parameters.

In this case, in step 12, determining, by the mobile terminal, the charging parameter corresponding to the specification parameter according to the determined specification parameter may specifically include:

determining, by the mobile terminal, the charging parameter corresponding to the specification parameter according to the determined specification parameter and the stored correspondence between specification parameters and charging parameters.

In the embodiment of the present invention, "charging parameter" includes: current intensity at each stage of charging, charging cutoff voltage, and protection time limit at each stage.

In the embodiment of the present invention, when the battery specification parameter is changed, the charging parameter corresponding to the changed battery specification parameter may be determined according to the changed battery specification parameter. Therefore, compared with the prior art in which the same charging parameter is used for batteries of any specifications, the embodiment of the present invention is capable of dynamically changing the charging parameter according to the battery specification parameter.

13. The mobile terminal charges the battery to be charged according to the determined charging parameter.

Before the battery is charged, the charging parameter corresponding to the battery needs to be determined. After the charging parameter is determined, a corresponding charging process may be implemented according to the charging parameter.

In the embodiment of the present invention, a specification parameter of a battery is determined first, and then a corresponding charging parameter is determined according to the determined specification parameter, so that the charging parameter is changed dynamically according to the specification parameter. Because charging time varies depending on the charging parameters of batteries, when the battery specification parameter is changed, the charging parameter is changed, and charging time is changed accordingly. Compared with the prior art in which a unified charging parameter is used for batteries of any specifications, the embodiment of the present invention is capable of dynamically adjusting the charging parameter according to the specification parameter, for example, for a small-capacity battery, using a charging parameter dedicated to the small-capacity battery, and for a large-capacity battery, using a charging parameter dedicated to the large-capacity battery. In this way, safety can be ensured, and fast charging can be implemented for a battery, and in particular, a large-capacity battery. Evidently, the embodiment of the present invention is capable of implementing adaptive fast charging according to the specification parameter while ensuring safety, so as to shorten the charging time and enhance the user experience.

Further description is provided below.

Specifically, in the embodiment of the present invention, a specification parameter may be determined by using two methods, that is, a contact identification method and a parameter method. The two methods are described below.

1. Contact Identification Method

In the method, based on the contacts and elastic metal mechanism that are already implemented, contacts capable of identifying a battery signal truth table are added. The identification of the truth table of a main board is triggered by the contacts on the back cover of the mobile terminal (similar to the identification of frequency bands in a radio frequency truth table), so that different charging parameters are executed according to different specification parameters of installed batteries in a range allowed by a charger.

When the contact identification method is used, determining the specification parameter of the battery to be charged in step 11 may include:

obtaining a combination of level values of sampling points on a circuit board of the mobile terminal by analog/digital sampling, where the combination of level values refers to combined level values of sampling points, for example, if the level value of a first sampling point is 1, and level values of a second sampling point and a third point are both 0, the combination of level values of sampling points on the circuit board is 1/0/0.

The specification parameter of the battery to be charged is determined according to the obtained combination of level values and correspondence between level value combinations and battery specification parameters in a pre-stored sampled level truth table.

Specifically, the combination of sampled level values may be searched for in the pre-stored sampled level truth table, and after the combination of sampled level values is found, the specification parameter of the battery is determined in the sampled level truth table according to the correspondence between level value combinations and specification parameters.

In the prior art, when a battery is charged, the specification parameter of the battery is not detected in advance; batteries of any capacities are charged according to a preset charging parameter; and when the battery specification parameter is changed, because the charging parameter is not changed, the charging time may be too long. In the embodiment of the present invention, the specification parameter is determined first, and for batteries with different specification parameters, charging parameters most suitable for charging the batteries with the specification parameters are adopted, so that the charging time is saved while safety is ensured.

Alternatively, the obtaining the combination of level values of sampling points on the circuit board of the mobile terminal by analog/digital sampling may include:

detecting levels of analog/digital sampling points on the circuit board to obtain level values corresponding to the analog/digital sampling points on the circuit board, where the circuit board is arranged with at least one weld connected to a power supply, the back cover of the mobile terminal is arranged with a contact corresponding to the at least one weld, a level value is a high level 1 when a weld of each of the analog/digital sampling points on the circuit board is connected through a corresponding contact on the back cover of the mobile terminal, and a level value is a low level 0 when a weld of each of the analog/digital sampling points on the circuit board is not connected through a corresponding contact on the back cover of the mobile terminal; and obtaining a combination of level values of the sampling points on the circuit board according to the level values obtained by detection.

Of course, if the contact identification method is used to determine the specification parameter of the battery, alternatively, before determining the specification parameter of the battery, the method may further include:

storing a preset sampled level truth table, where the sampled level truth table includes sampled level value combinations corresponding to battery specification parameters.

The sampled level truth table may be burned into a mobile terminal before the mobile terminal is delivered from a factory. For different mobile terminals, the sampled level truth table may vary. To facilitate universal applications, different manufacturers may preferably adopt a unified sampled level truth table.

Figure 1B:
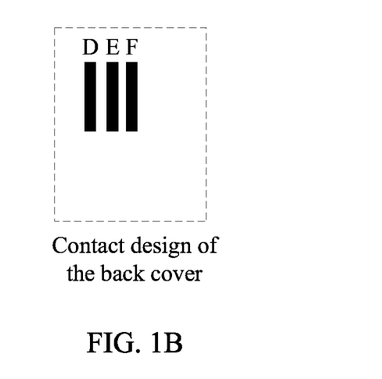
FIG. 1B is a schematic diagram of contact design of a back cover according to an embodiment of the present invention.
Figure 1C:
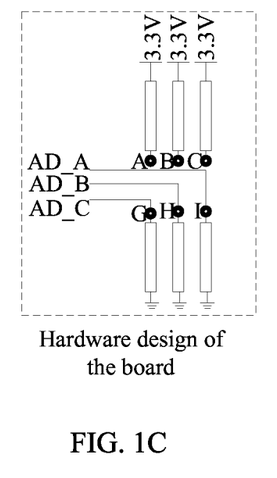
FIG. 1C is a schematic diagram of hardware design of a circuit board according to an embodiment of the present invention.

The contact identification method is described below in detail with reference to FIG. 1B and FIG. 1C. As shown in FIG. 1B, D/E/F in the contact design of the back cover each represent a metal contact for an optional weld. As shown in FIG. 1C, a hardware circuit board is arranged with 6 metal welds A\B\C and G\H\I. Three metal welds A\B\C each are connected to a positive electrode. Three metal welds G\H\I each are connected to the ground. Metal welds A and G correspond to a contact D. Metal welds B and H correspond to a contact E. Metal welds C and I correspond to a contact F. Normally, when the back cover is apart or no metal contact is available in the contact position of the back cover, sampling points AD_A, AD_B, and AD_C are all grounded, and level values obtained by analog/digital (AD) sampling are all the low level 0. When at least one contact of D\E\F is added to the back cover and the back cover is installed, the corresponding sampling points are connected, and the levels of the analog/digital sampling points are changed.

For example, the sampled level truth table may be as shown in Table 1.

TABLE 1

| Contact on the Back Cover | Combination of Sampled Level Values | Specification Parameter |
|---|---|---|
| D\E\F | 1\1\1 | 4500 maH |
| D\E\0 | 1\1\0 | 4000 maH |
| D\0\F | 1\0\1 | 3500 maH |
| D\0\0 | 1\0\0 | 3000 maH |
| 0\E\F | 0\1\1 | 2500 maH |
| 0\E\0 | 0\1\0 | 2000 maH |
| 0\0\F | 0\0\1 | 1500 maH |
| 0\0\0 | 0\0\0 | 1000 maH |

When different batteries are used, by reserving the contacts D\E\F on the back cover, change of sampled levels on the circuit board is triggered. Installed specification parameters can be identified according to the sampled level truth table formed by the sampled levels. In a software process, charging is implemented by using charging parameters corresponding to the stored specification parameters.

Of course, in the embodiment of the present invention, the parameter method may also used to determine the specification parameter. Detailed description is provided below.

2. Parameter Method

In this method, the mobile terminal first determines a specification indication parameter of a battery to be charged, where the specification indication parameter is used to indicate the specification parameter of the battery; then the mobile terminal determines the specification parameter of the battery according to the specification indication parameter and correspondence between specification indication parameters and battery specification parameters in a pre-stored specification indication parameter table.

The specification indication parameter may a slope of a voltage boost of the battery under a preset current in a unit time or a voltage value of the battery at a specified moment.

In the following description, it is assumed that the specification indication parameter is a slope of a voltage boost of the battery under a preset current in a unit time.

When a constant current is used for charging, batteries having different specification parameters have different voltage boosts in a unit time in most voltage intervals. Therefore, the specification parameter may be determined by using this method by calculating the slope of the voltage boost.

When this method is used, determining, by the mobile terminal, the specification parameter of the battery according to the specification indication parameter and correspondence between specification indication parameters and battery specification parameters in the pre-stored specification indication parameter table may include:

determining, by the mobile terminal, the specification parameter of the battery according to the slope of the voltage boost and correspondence between slopes of voltage boosts and battery specification parameters in a pre-stored voltage slope interval table, where the voltage slope interval table includes slope intervals of voltage boosts corresponding to different battery specification parameters.

Specifically, for example, the mobile terminal may first determine the slope of a voltage boost of the battery under a preset current in a unit time. The slope of the voltage boost is equal to the numerical value of the voltage boost of the battery under the preset current in the unit time divided by the unit time. The preset current is preferably a constant current. Then, the slope of the voltage boost is searched for in the pre-stored voltage slope interval table, and the specification parameter of the battery is determined. That is, after the slope of the voltage boost of the battery under the preset current in the unit time is determined, a specific slope interval into which the slope falls in the pre-stored voltage slope interval table is determined, and then a corresponding battery specification parameter is determined according to the correspondence between slope intervals and battery specification parameters.

In the prior art, when a battery is charged, the specification parameter of the battery is not detected in advance; batteries having any specification parameters are charged according to a preset charging parameter; and when the specification parameter is changed, because the charging parameter is not changed, the charging time may be too long. In the embodiment of the present invention, the specification parameter is determined first, and for batteries with different specification parameters, charging parameters most suitable for charging the batteries with the specification parameters are adopted, so that the charging time is saved while safety is ensured.

In a power-off charging state, the mobile terminal can make determination without any impact from a radio frequency unit or other units. In this case, the current consumed on the circuit board is constant, and the power supplied to the battery in a unit time is basically fixed. Therefore, the obtained result of determining the slope of the battery in the power-off charging state is more accurate than those obtained in other states. Therefore, alternatively, determining the slope of the voltage boost of the battery under the constant current in the unit time may specifically include:

determining the slope of a voltage boost of the battery under a constant current in a unit time when the battery is in the power-off charging state.

Specifically, a combination of keys (similar to a combination of keys in forcible upgrade mode), the web background, and so on may be used to force a system to enter a power-off charging mode.

In addition, if the parameter method is used to determine the specification parameter of the battery, alternatively, before determining the specification parameter of the battery, the method may further include:

storing a preset voltage slope interval table, where the voltage slope interval table includes slope intervals of voltage boosts corresponding to batteries of different capacities.

It is assumed that the battery specification parameter is a battery capacity. The capacities of mainstream batteries are generally 1000 maH to 4500 maH. For example, for battery capacities, an interval of 500 maH may be set to correspond to a slope interval, that is, 1000 maH is set to correspond to a slope interval, 1500 maH is set to correspond to another slope interval, and so on, where a range of each slope interval may be obtained by using experiment data. Of course, battery capacities may also adopt other smaller or larger intervals.

It should be noted that the preceding description is provided by only taking an example that the specification indication parameter is a slope of a voltage boost of the battery under a preset current in a unit time. Of course, those skilled in the art may easily figure out that the specification indication parameter may be other numerical values, for example, a voltage value of the battery at a specified moment.

When the specification indication parameter is a voltage value of the battery at a specified moment, determining, by the mobile terminal, the specification parameter of the battery according to the specification indication parameter and correspondence between specification indication parameters and battery specification parameters in a pre-stored specification indication parameter table may include:

determining, by the mobile terminal, the specification parameter of the battery according to the voltage value and correspondence between voltage values and battery specification parameters in a pre-stored voltage table.

Specifically, for example, a voltage table may be pre-stored, where the voltage table includes correspondence between voltage values obtained by experiment or other means and specification parameters. After the voltage value of the battery at the specified moment is obtained, the specification parameter of the battery may be further determined by comparing the voltage value with the voltage values stored in the voltage table.

It should be specially noted that the embodiment of the present invention may adopt either of the parameter method and the contact identification method to determine the specification parameter. Of course, the two methods may be both integrated into the mobile terminal, and the specification parameter is determined according to requirements. For example, in the use of the methods, the contact identification method may be used first, and when the contact identification method fails or needs to be checked, the parameter method is used. Of course, other methods easily thought of by those skilled in the art may also be used.

It should also be noted that the battery charging method provided by the embodiment of the present invention can not only shorten the charging time, but also greatly reduce the workload of developers because developers only need to design one set of universal software codes applicable to batteries of different capacities at a programming stage, while in the prior art, different software codes need to be developed for batteries having different specification parameters (for example, capacity). Furthermore, because the battery specification parameter is determined before the battery is charged, in use, batteries having different specification parameters may be used as standard accessories for replacement, and even batteries provided by users can be used.

For better understanding the technical solution of the battery charging method provided by the embodiment of the present invention, detailed description is further arranged with reference to two exemplary embodiments. In the two embodiments, the specification parameter of a battery is battery capacity.

Figure 2:
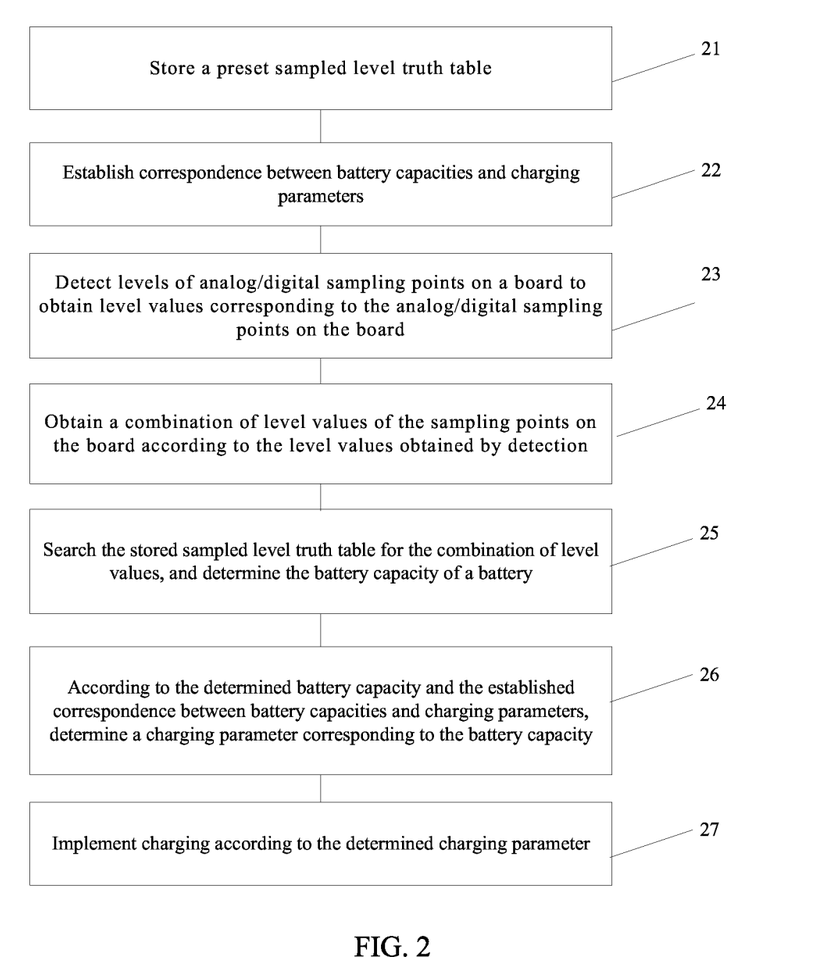
FIG. 2 is a specific flowchart of a battery charging method according to an embodiment of the present invention.

An embodiment of the present invention provides a battery charging method. As shown in FIG. 2, the method includes the following:

21. Store a preset sampled level truth table, where the sampled level truth table includes sampled level value combinations corresponding to batteries of different capacities.

22. Establish correspondence between battery capacities and charging parameters.

23. Detect levels of analog/digital sampling points on a circuit board to obtain level values corresponding to the analog/digital sampling points on the circuit board, where the circuit board is arranged with at least one weld connected to a power supply, the back cover of a mobile terminal is arranged with a contact corresponding to the at least one weld, a level value is a high level 1 when a weld of each of the analog/digital sampling points on the circuit board is connected through a corresponding contact on the back cover of the mobile terminal, and a level value is a low level 0 when a weld of each of the analog/digital sampling points on the circuit board is not connected through a corresponding contact on the back cover of the mobile terminal.

24. Obtain a combination of level values of the sampling points on the circuit board according to the level values obtained by detection.

25. Search the stored sampled level truth table for the combination of level values, and determine the battery capacity of a battery.

26. According to the determined battery capacity and the established correspondence between battery capacities and charging parameters, determine a charging parameter corresponding to the battery capacity.

27. Implement charging according to the determined charging parameter.

By using the battery charging method provided by the embodiment, the battery capacity of a battery is determined first, and then the corresponding charging parameter is determined according to the determined battery capacity, so that the charging parameter is changed dynamically according to the battery capacity. Because charging time varies depending on the charging parameters of batteries, when the battery capacity is changed, the charging parameter is changed, and charging time is changed accordingly. Compared with the prior art in which a unified charging parameter is used for batteries of any capacities, the embodiment of the present invention is capable of dynamically adjusting the charging parameter according to the battery capacity, for example, for a small-capacity battery, using a charging parameter dedicated to the small-capacity battery, and for a large-capacity battery, using a charging parameter dedicated to the large-capacity battery. In this way, safety can be ensured, and fast charging can be implemented for a battery, and in particular, a large-capacity battery. Evidently, the embodiment of the present invention is capable of implementing adaptive fast charging according to the battery capacity while ensuring safety, so as to shorten the charging time and enhance the user experience. In another aspect, in use, batteries having different capacities may be used as standard accessories for replacement, and even batteries provided by users can be used.

Figure 3:
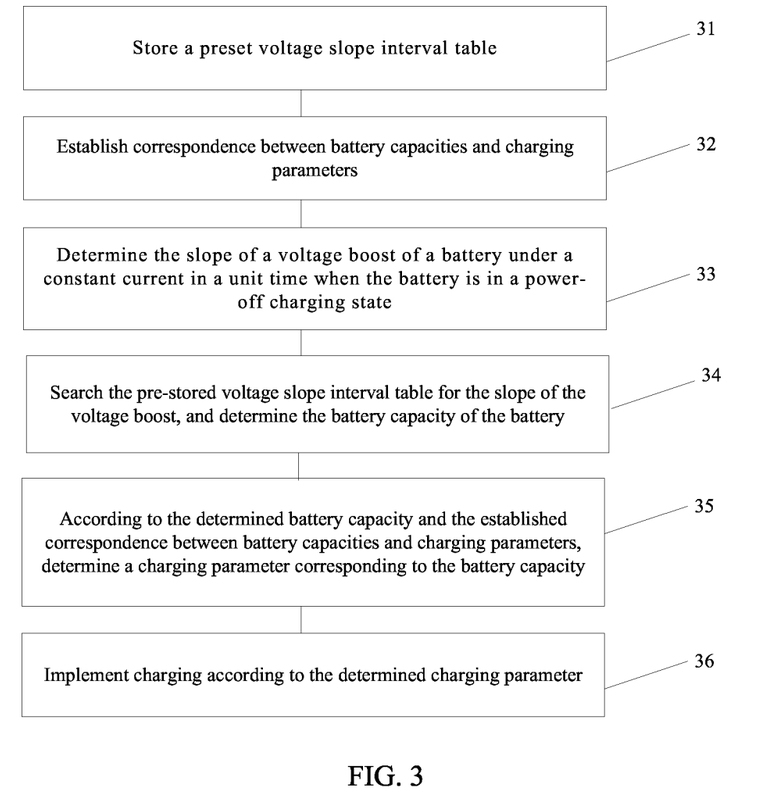
FIG. 3 is a specific flowchart of a battery charging method according to an embodiment of the present invention.

Another embodiment of the present invention provides a battery charging method. As shown in FIG. 3, the method includes the following:

31. Store a preset voltage slope interval table, where the voltage slope interval table includes slope intervals of voltage boosts corresponding to batteries of different capacities.

32. Establish correspondence between battery capacities and charging parameters.

33. Determine the slope of a voltage boost of a battery under a constant current in a unit time when the battery is in a power-off charging state, where the slope of the voltage boost is equal to the numerical value of the voltage boost of the battery under the constant current in the unit time divided by the unit time.

34. Search the pre-stored voltage slope interval table for the slope of the voltage boost, and determine the battery capacity of the battery.

35. According to the determined battery capacity and the established correspondence between battery capacities and charging parameters, determine a charging parameter corresponding to the battery capacity.

36. Implement charging according to the determined charging parameter.

In the battery charging method provided by the embodiment, the battery capacity of a battery is determined first, and then the corresponding charging parameter is determined according to the determined battery capacity, so that the charging parameter is changed dynamically according to the battery capacity. Because charging time varies depending on the charging parameters of batteries, when the battery capacity is changed, the charging parameter is changed, and charging time is changed accordingly. Compared with the prior art in which a unified charging parameter is used for batteries of any capacities, the embodiment of the present invention is capable of dynamically adjusting the charging parameter according to the battery capacity, for example, for a small-capacity battery, using a charging parameter dedicated to the small-capacity battery, and for a large-capacity battery, using a charging parameter dedicated to the large-capacity battery. In this way, safety can be ensured, and fast charging can be implemented for a battery, and in particular, a large-capacity battery. Evidently, the embodiment of the present invention is capable of implementing adaptive fast charging according to the battery capacity while ensuring safety, so as to shorten the charging time and enhance the user experience. In another aspect, in use, batteries having different capacities may be used as standard accessories for replacement, and even batteries provided by users can be used.

Figure 4A:
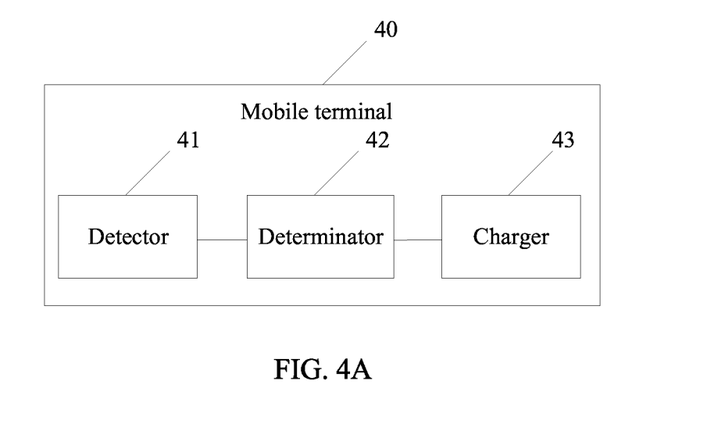
FIG. 4A is a structural block diagram of a mobile terminal according to an embodiment of the present invention.

Correspondingly, an embodiment of the present invention provides a mobile terminal 40. As shown in FIG. 4A, the mobile terminal 40 includes:

a detector 41, configured to determine a specification parameter of a battery to be charged. Alternatively, the specification parameter of the battery includes: battery capacity and charging limiting voltage, and the detector 41 is configured to determine the battery capacity and/or charging limiting voltage of the battery to be charged.

a determinator 42, configured to determine a charging parameter corresponding to the specification parameter according to the specification parameter determined by the detector 41. The determinator may be configured to determine a charging parameter corresponding to the battery capacity and/or charging limiting voltage according to the determined battery capacity and/or charging limiting voltage.

a charger 43, configured to charge the battery according to the charging parameter determined by the determinator.

In the embodiment of the present invention, a specification parameter of a battery is determined first, and then a corresponding charging parameter is determined according to the determined battery specification parameter, so that the charging parameter is changed dynamically according to the battery specification parameter. Because charging time varies depending on the charging parameters of batteries, when the battery specification parameter is changed, the charging parameter is changed, and charging time is changed accordingly. Compared with the prior art in which a unified charging parameter is used for batteries having any specification parameters, the embodiment of the present invention is capable of dynamically adjusting the charging parameter according to the battery specification parameter, for example, for a small-capacity battery, using a charging parameter dedicated to the small-capacity battery, and for a large-capacity battery, using a charging parameter dedicated to the large-capacity battery. In this way, safety can be ensured, and fast charging can be implemented for a battery, and in particular, a large-capacity battery. Evidently, the embodiment of the present invention is capable of implementing adaptive fast charging according to the specification parameter while ensuring safety, so as to shorten the charging time and enhance the user experience.

Figure 4B:
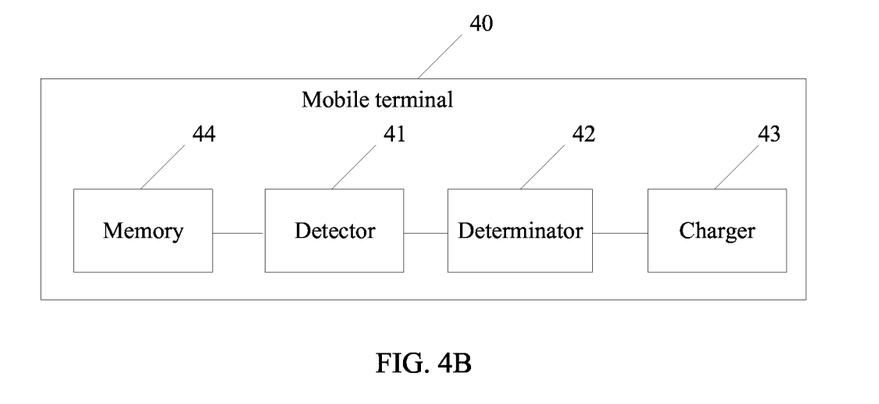
FIG. 4B is another structural block diagram of a mobile terminal according to an embodiment of the present invention.

Further, as shown in FIG. 4B, the mobile terminal 40 includes:

a memory 44, configured to store correspondence between battery specification parameters and charging parameters before the detector 41 determines the specification parameter of the battery to be charged.

The determinator 42 is specifically configured to:

determine the charging parameter corresponding to the specification parameter according to the specification parameter determined by the detector 41 and the stored correspondence between battery specification parameters and charging parameters.

Figure 4C:
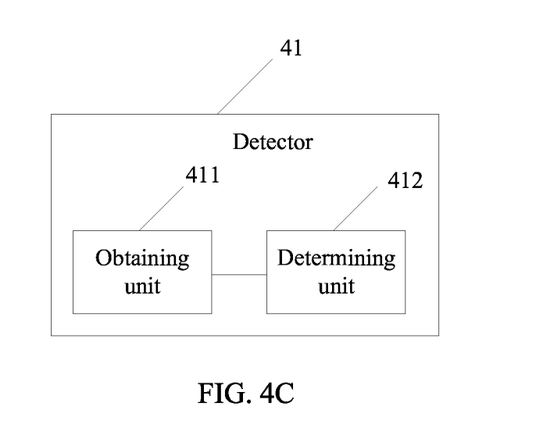
FIG. 4C is a structural block diagram of a determinator in a mobile terminal according to an embodiment of the present invention.

Alternatively, as shown in FIG. 4C, the detector 41 may include:

an obtaining unit 411, configured to obtain a combination of level values of sampling points on a circuit board of the mobile terminal by analog/digital sampling; and a determining unit 412, configured to determine the specification parameter of the battery according to the obtained combination of level values and correspondence between level value combinations and battery specification parameters in a pre-stored sampled level truth table.

Alternatively, the circuit board of the mobile terminal is arranged with at least one weld connected to a power supply, a back cover of the mobile terminal is arranged with a contact corresponding to the at least one weld, and the obtaining unit 411 is specifically configured to:

detect levels of analog/digital sampling points on the circuit board to obtain level values corresponding to the analog/digital sampling points on the circuit board, where a level value is a high level 1 when a weld of each of the analog/digital sampling points on the circuit board is connected through a corresponding contact on the back cover of the mobile terminal, and a level value is a low level 0 when a weld of each of the analog/digital sampling points on the circuit board is not connected through a corresponding contact on the back cover of the mobile terminal; and obtain a combination of level values of the sampling points on the circuit board according to the level values obtained by detection.

Or, alternatively, the detector 41 may be further configured to:

determine a specification indication parameter of the battery; and determine the specification parameter of the battery according to the determined specification indication parameter and correspondence between specification indication parameters and battery specification parameters in a pre-stored specification indication parameter table.

The specification indication parameter may a slope of a voltage boost of the battery under a preset current in a unit time or a voltage value of the battery at a specified moment.

When the specification indication parameter is a slope of a voltage boost of the battery under a preset current in a unit time, the slope of the voltage boost is equal to the numerical value of the voltage boost of the battery under the preset current in the unit time divided by the unit time; and the detector 41 is specifically configured to:

determine the specification parameter of the battery according to the slope of the voltage boost and correspondence between slopes of voltage boosts and battery specification parameters in a pre-stored voltage slope interval table, where the voltage slope interval table includes slope intervals of voltage boosts corresponding to different battery specification parameters.

When the specification indication parameter is a voltage value of the battery at a specified moment, the detector 41 is configured to:

determine the specification parameter of the battery according to the voltage value and correspondence between voltage values and battery specification parameters in a pre-stored voltage table.

It should be noted that in the mobile terminal provided in the embodiment, the division of the included units and modules is based on function logic. However, the division is not limited thereto so long as corresponding functions can be implemented. In addition, the functional units and modules are named for the purpose of differentiation only and the names are not intended to limit the protection scope of the present invention.

It is understandable to persons of ordinary skill in the art that all or part of the steps in the preceding method embodiments may be performed by a program instructing hardware. The program may be stored in a computer-readable storage medium such as a read-only memory, a magnetic disk, or a CD-ROM.

The foregoing description is merely about specific embodiments of the present invention, but is not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A mobile terminal, comprising:
a detector, configured to detect level values of a plurality of sampling points on a circuit board of the mobile terminal by analog/digital sampling, to obtain a combination of level values of sampling points, and to determine a specification parameter of a battery to be charged;
a processor, configured to determine a charging parameter corresponding to the specification parameter, the charging parameter determined according to the specification parameter determined by the detector; and
a charger, configured to charge the battery to be charged according to the charging parameter determined by the processor.

2. The mobile terminal according to claim 1, wherein the specification parameter of the battery comprises battery capacity and charging limiting voltage;
wherein the detector is configured to determine the battery capacity and/or charging limiting voltage of the battery to be charged; and
wherein the processor is configured to determine the charging parameter corresponding to the battery capacity and/or charging limiting voltage, according to the determined battery capacity and/or charging limiting voltage.

3. The mobile terminal according to claim 2, wherein the detector is configured to determine the specification parameter of the battery according to the obtained combination of level values and correspondence between level value combinations and battery specification parameters in a pre-stored sampled level truth table.

4. The mobile terminal according to claim 3, wherein the circuit board of the mobile terminal is arranged with at least one weld connected to a power supply, a back cover of the mobile terminal is arranged with a contact corresponding to the at least one weld, and wherein the detector is specifically configured to:
detect levels of analog/digital sampling points on the circuit board to obtain level values corresponding to the analog/digital sampling points on the circuit board, wherein a level value is a high level 1 when a weld of each of the analog/digital sampling points on the circuit board is connected through a corresponding contact on the back cover of the mobile terminal, and a level value is a low level 0 when a weld of each of the analog/digital sampling points on the circuit board is not connected through a corresponding contact on the back cover of the mobile terminal; and
obtain a combination of level values of the sampling points on the circuit board according to the level values obtained by the detection.

5. The mobile terminal according to claim 1, wherein the detector is further configured to:
determine a specification indication parameter of the battery; and
determine the specification parameter of the battery according to the determined specification indication parameter and correspondence between specification indication parameters and battery specification parameters in a pre-stored specification indication parameter table.

6. The mobile terminal according to claim 5, wherein the specification indication parameter is a slope of a voltage boost of the battery under a preset current in a unit time, wherein the slope of the voltage boost is equal to a numerical value of the voltage boost of the battery under the preset current in the unit time divided by the unit time; and the detector is configured to determine the specification parameter of the battery according to the slope of the voltage boost and correspondence between slopes of voltage boosts and battery specification parameters in a pre-stored voltage slope interval table, wherein the voltage slope interval table comprises slope intervals of voltage boosts corresponding to different battery specification parameters.

7. The mobile terminal according to claim 6, wherein the specification indication parameter is a voltage value of the battery at a specified moment and wherein the detector is configured to determine the specification parameter of the battery according to the voltage value and correspondence between voltage values and battery specification parameters in a pre-stored voltage table.

8. The mobile terminal according to claim 1, wherein the mobile terminal further comprises:
   a memory, configured to store correspondence between specification parameters and charging parameters before the specification parameter of the battery is determined;
   wherein the processor is configured determine the charging parameter corresponding to the specification parameter according to the specification parameter determined by the detector and the stored correspondence between specification parameters and charging parameters.

9. A battery charging method, wherein the method comprises:
   detecting, by a mobile terminal, levels of analog/digital sampling points on a circuit board to obtain level values corresponding to the analog/digital sampling points on the circuit board, wherein the circuit board is arranged with at least one weld connected to a power supply, a back cover of the mobile terminal is arranged with a contact corresponding to the at least one weld, a level value is a high level 1 when a weld of each of the analog/digital sampling points on the circuit board is connected through a corresponding contact on the back cover of the mobile terminal, and a level value is a low level 0 when a weld of each of the analog/digital sampling points on the circuit board is not connected through a corresponding contact on the back cover of the mobile terminal;
   obtaining, by the mobile terminal, a combination of level values of the sampling points on the circuit board according to the level values obtained by the detection;
   determining, by the mobile terminal according to the obtained combination of level values and correspondence between level value combinations and battery specification parameters in a pre-stored sampled level truth table, the specification parameter of the battery to be charged;
   determining, by the mobile terminal, a charging parameter corresponding to the specification parameter, the charging parameter determined according to the determined specification parameter; and
   charging, by the mobile terminal, the battery to be charged according to the determined charging parameter.

* * * * *